US007548795B2

(12) United States Patent
Sagasaki et al.

(10) Patent No.: US 7,548,795 B2
(45) Date of Patent: Jun. 16, 2009

(54) NUMERICAL CONTROL SYSTEM (75) Inventors: Masakazu Sagasaki, Tokyo (JP);
Hirohusa Kamiya, Nagoya (JP); Toru Takeyama, Nagoya (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 509 days.

(21) Appl. No.: 10/549,114

(22) PCT Filed: Mar. 17, 2003

(86) PCT No.: PCT/JP03/03135

§ 371 (c)(1),
(2), (4) Date: Mar. 10, 2006

(87) PCT Pub. No.: WO2004/083975

PCT Pub. Date: Sep. 30, 2004

(65) Prior Publication Data

US 2006/0173572 A1   Aug. 3, 2006

(51) Int. Cl.
*G06F 19/00* (2006.01)
*G06F 17/00* (2006.01)
*G05B 19/18* (2006.01)

(52) U.S. Cl. .............. 700/181; 700/17; 707/104.1; 717/136; 715/961; 318/569

(58) Field of Classification Search ............ 700/17, 700/18, 83, 181, 182; 707/100, 101, 102, 707/104.1; 717/136, 139; 715/700, 739, 715/783, 961, 965; 318/567, 568.1, 568.23, 318/569
See application file for complete search history.

(56) References Cited

U.S. PATENT DOCUMENTS

| 4,797,811 | A | * | 1/1989 | Kiyokawa et al. ........... 700/181 |
| 5,600,584 | A | * | 2/1997 | Schlafly ....................... 708/551 |
| 6,006,141 | A | * | 12/1999 | Yoneda et al. ............... 700/169 |
| 2003/0195642 | A1 | * | 10/2003 | Ragnini ....................... 700/56 |

FOREIGN PATENT DOCUMENTS

| EP | 816959 A2 | 7/1997 |
| JP | 6-318109 A | 11/1994 |
| JP | 8-6623 A | 1/1996 |
| JP | 11-149307 A | 6/1999 |
| JP | 2001-228905 A | 8/2001 |
| JP | 2002-123306 A | 4/2002 |
| JP | 2003-53688 A | 2/2003 |
| WO | 01/44882 A1 | 6/2001 |

* cited by examiner

*Primary Examiner*—Sean P Shechtman
(74) *Attorney, Agent, or Firm*—Sughrue Mion, PLLC (57) ABSTRACT

A numerical control system using converted data is provided in which changes can be made quickly to the feed rate by speed override and the like, the operation of the machine according to the content of variable data, and workpiece offset data during machining operation. The numerical control system includes a machining-program/internal-processing conversion module for allocating during conversion a command in a machining program to an application program for the numerical control apparatus, a variable/offset conversion module for storing during conversion, with respect to a command such as a variable command and a tool offset command in the machining program, only referencing information for the command, and a conversion data executing module for directly executing, during machining program execution, the internal processing sequentially based on data allocated by the conversion module.

28 Claims, 8 Drawing Sheets

```
O110
#CONVERT#
.
G0X10.0;
M3;
#500=#105;
T1008;
G0X20.0;
.
.
```

Fig. 6

[MACHINING PROGRAM LIST]

■ O1000
■   |−O9000
□   |     |−O9010
■   |         |−O9020
■   |−O8800
.
.

[ CONVERT ]

Fig. 7

[CONVERSION RESULT LIST]

[CONVERSION ERROR DETAILS]

NUMERICAL CONTROL SYSTEM

TECHNICAL FIELD

The present invention relates to numerical control systems, and more specifically, to a numerical control system in which data is generated for allocating commands (such as G codes and auxiliary function, main axis function, tool function, and second auxiliary function (MSTB) commands) in a machining program to internal processing units (application programs) of the numerical control apparatus. The numerical control apparatus performs high-speed control actions during a run of the machining program.

BACKGROUND ART

A numerical control apparatus performs numerical control processing according to a machining program commanded by a paper tape or the like, and drives a machining apparatus based on the processing result, to machine a workpiece exactly according to the command.

Meanwhile, generally numerical control apparatuses adopt a von Neumann computer configuration using a microprocessor, and the software that controls the system employs a time-sharing control system using a real time operating system. In these systems, because sequential processing programs—hierarchically structured tasks—are executed in a time-sharing manner in a predetermined order, according to interrupt signals ("interrupts", hereinafter referred to as ITs) every control unit time $\Delta T$ (e.g., 10 ms), blanks are occasionally produced in the computing result output when a program being executed is interrupted along the way. These appear in the numerical control apparatus as absent control information on the machine (tool) position, namely, as a phenomenon where null data is output. Although an interruption in most cases does not affect the machined surface, accumulation of interruptions—while being very small amounts of time—contributes to increased cycle time.

Therefore, as a means for resolving the above-described problem, for example, a control system is present as described in the specification of International Publication Number: WO01-44882 A1, in which a specified machining program is converted, in advance before machining operation, with respect to the NC shaft, into control data for positioning, interpolation feeding, or the like according to interpolation data, and is converted, with respect to the main shaft, into control data for performing operations on the main shaft, such as rotation at a commanded rotational frequency, stop, and an orientation operation; and during the machining operation, the servo motor or the main-shaft motor is controlled using the converted data.

However, because the system replaces the machining program with control data for positioning or interpolation feeding according to the interpolation data, there is a problem in that the system cannot respond to cases when an operator desires to change the feed rate by speed override or the like, when the operator desires to change the operation of the machine according to the content of the variable data, or when the operator desires to change the workpiece offset data during the machining operation.

In addition, a problem has been that a plurality of machining programs cannot be converted all at once, and another problem has been that the operator must always perform the conversion operation before the machining operation.

DISCLOSURE OF THE INVENTION

The present invention is made to resolve the problems described above, and is configured so as to include: a conversion means for generating, before a machining program is run, data for allocating commands in the machining program to internal processing units of a numerical control apparatus; and a conversion data executing means for directly executing the internal processing unit in sequence during a run of the machining program, based on the data generated by the conversion means.

Moreover, in the present invention, when a command in the machining program is a G code or an MSTB command, the conversion means stores in a table provided in memory a numerical-control-apparatus internal processing unit address, and a parameter, for the machining-program command.

Furthermore, in the present invention, when a command in the machining program is a variable command or an offset command, the conversion means stores in a table provided in the memory a numerical-control-apparatus internal processing unit address and a numerical-control-apparatus referencing address.

Moreover, the present invention is configured so as to include: a machining-program/internal-processing conversion means for, before a machining program is run, when a command in the machining program is a G code or an MSTB command, storing in a table provided in the memory a numerical-control-apparatus internal processing unit address, and a parameter, for the machining-program command; a variable/offset conversion means for, before a machining program is run, when a command in the machining program is a variable command or an offset command, storing in the table provided in the memory a numerical-control-apparatus internal processing unit address, and a numerical-control-apparatus referencing address, for the machining-program command; and a conversion data executing means for directly executing, based on data generated by the machining-program/internal-processing conversion means and the variable/offset conversion means, the internal processing unit in sequence during a run of the machining program.

Therefore, because an analyzing section does not operate during a run of the machining program (an analyzing section is not required), blanks are never produced in the computing result output due to interruption of the computation along the way, and the cycle time can be reduced without increasing the CPU load on the side of the numerical control apparatus, so that productivity is enhanced.

Moreover, even when the operation of the machine is desired to vary according to the content of the variable data, or even when the operator desires to change the workpiece offset data during the machining operation, the operation change or the data change is quickly made effective. Furthermore, the operator does not have to perform a conversion operation every time a variable or a tool offset is changed.

Moreover, the present invention is configured so as to include an I/O signal notifying means for detecting a system-operator-working signal, and notifying the internal processing unit of a condition in accordance with the content of the signal.

Therefore, the operator can change the feed rate by means of the speed override or the like even during the machining operation. In short, operating conditions can be easily changed.

Furthermore, the present invention is configured so as to include a conversion data judging means for judging, during a run of the machining program, whether converted data is present, and for requesting the conversion data executing means to execute the converted data if the converted data is present.

Therefore, with respect to the machining program in which converted data is present, the converted data is necessarily used.

Furthermore, the present invention is configured so as to include a conversion-target-program judging means for detecting an instruction indicating conversion enable/disable written in the machining program, and for requesting the conversion means to convert only machining programs that include a conversion-enable instruction.

Therefore, compared to the case in which the machining programs are converted all at once, the memory area (memory usage) in which the converted data is registered can be reduced.

Moreover, the present invention is configured to include a conversion program selecting means for displaying on a display a machining program list and selecting a program to be converted from the machining program list; and a conversion-target-program judging means for referring to the data selected by the conversion program selecting means, and for requesting the conversion means to convert only machining programs that include a conversion-enable instruction.

Therefore, compared to the case in which the machining programs are converted all at once, the memory area (memory usage) in which the converted data is registered can be reduced.

Furthermore, the present invention is configured to include a conversion result listing means for displaying on a display conversion results as a list.

Therefore, even when a lot of machining programs are converted all at once, the operator can easily check the conversion results for each of the machining programs.

Moreover, the present invention is configured to include a conversion error display means for displaying on a display detailed information on conversion errors.

Therefore, even when a lot of machining programs are converted all at once, the operator can easily check conversion errors for each of the machining programs.

Furthermore, the present invention is configured to include a power-on machining-program-conversion activating means for activating the conversion means at system power-on.

Therefore, the operator does not have to perform the conversion operation.

Moreover, the present invention is configured to include a machining-program-conversion activating means for activating the conversion means by input of a programmable logic controller (PLC) signal.

Therefore, the operator does not have to perform the conversion operation.

BEST MODE FOR CARRYING OUT THE INVENTION

Embodiment 1

Hereinafter, Embodiment 1 of the present invention will be described in reference to FIG. 1 through FIG. 11.

Figure 1:
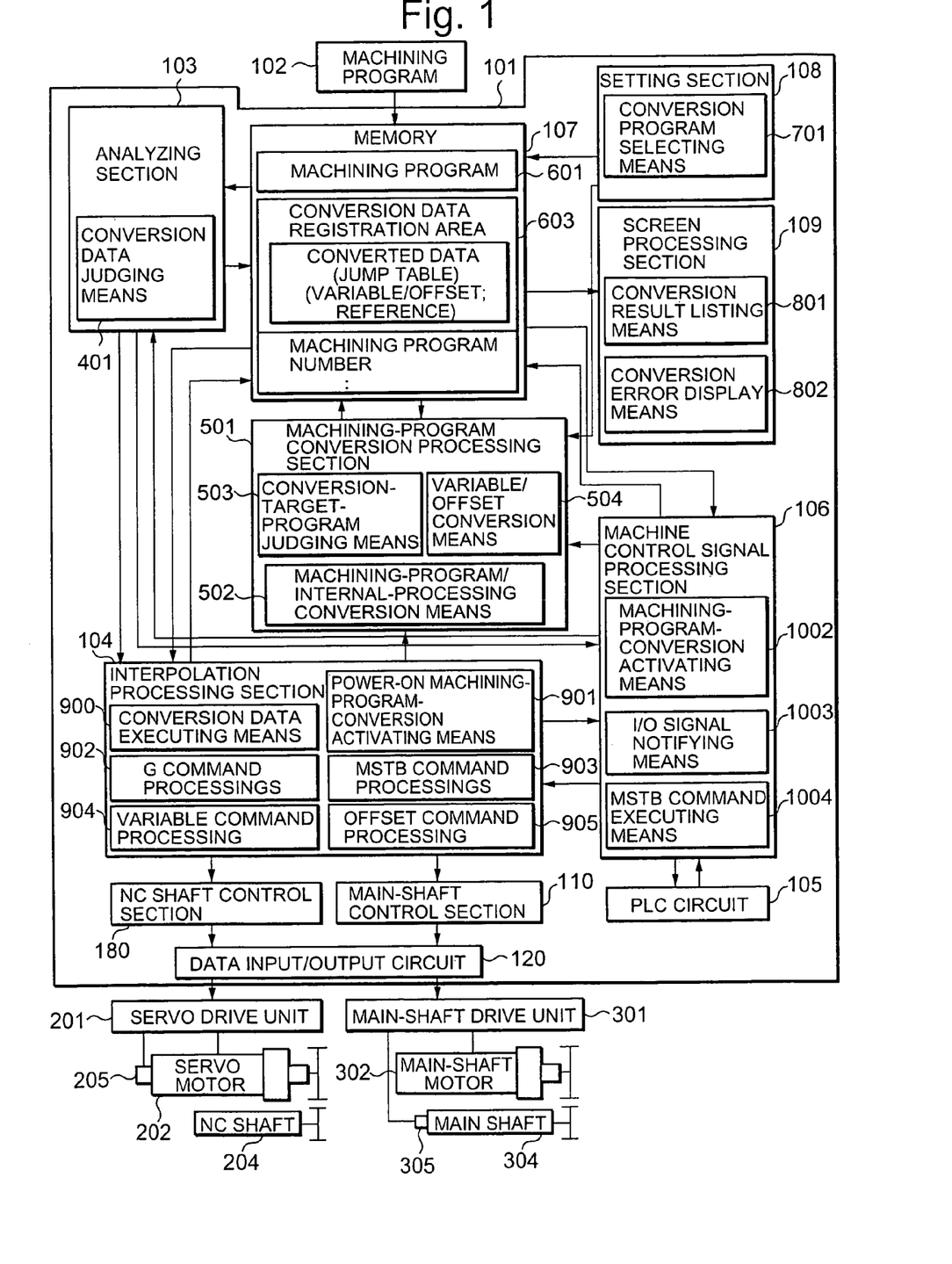
FIG. 1 is a block diagram for key components of a numerical control apparatus having a machining-program conversion function according to Embodiment 1 of the present invention.
Figure 2:
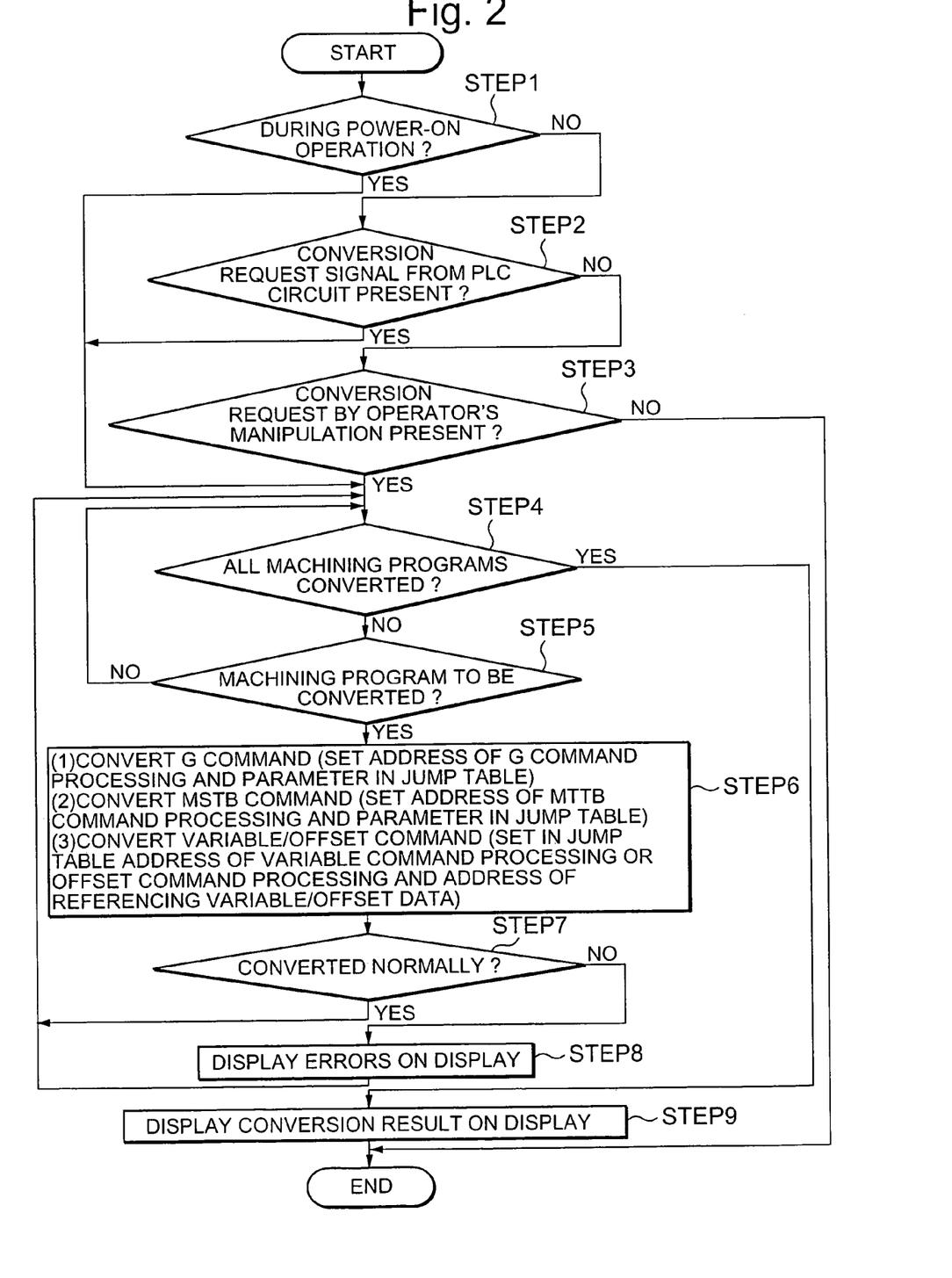
FIG. 2 is a flowchart illustrating machining-program conversion procedures according to Embodiment 1 of the present invention.
Figure 3:
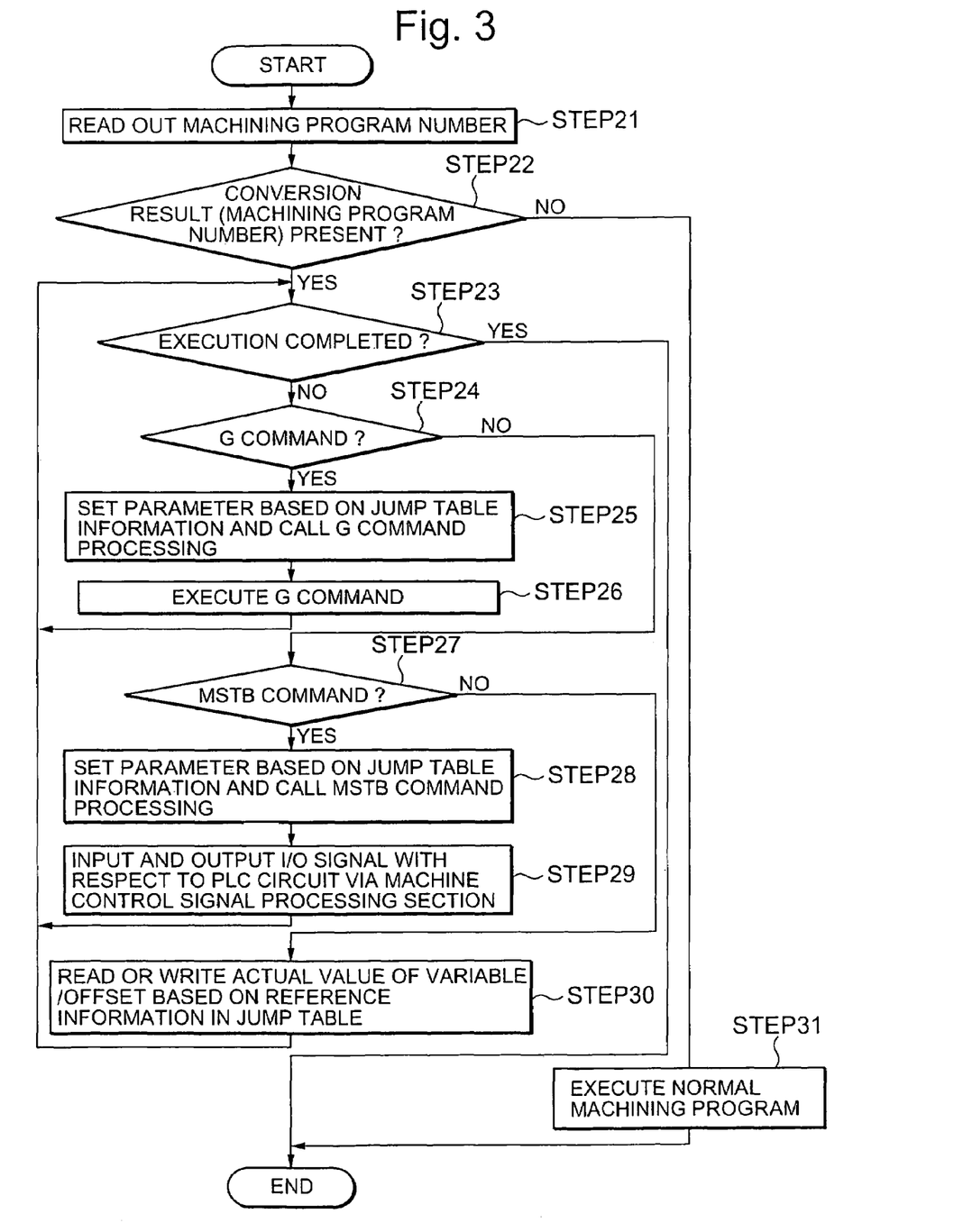
FIG. 3 is a flowchart illustrating procedures for executing converted data during a machining operation, according to Embodiment 1 of the present invention.
Figure 4:
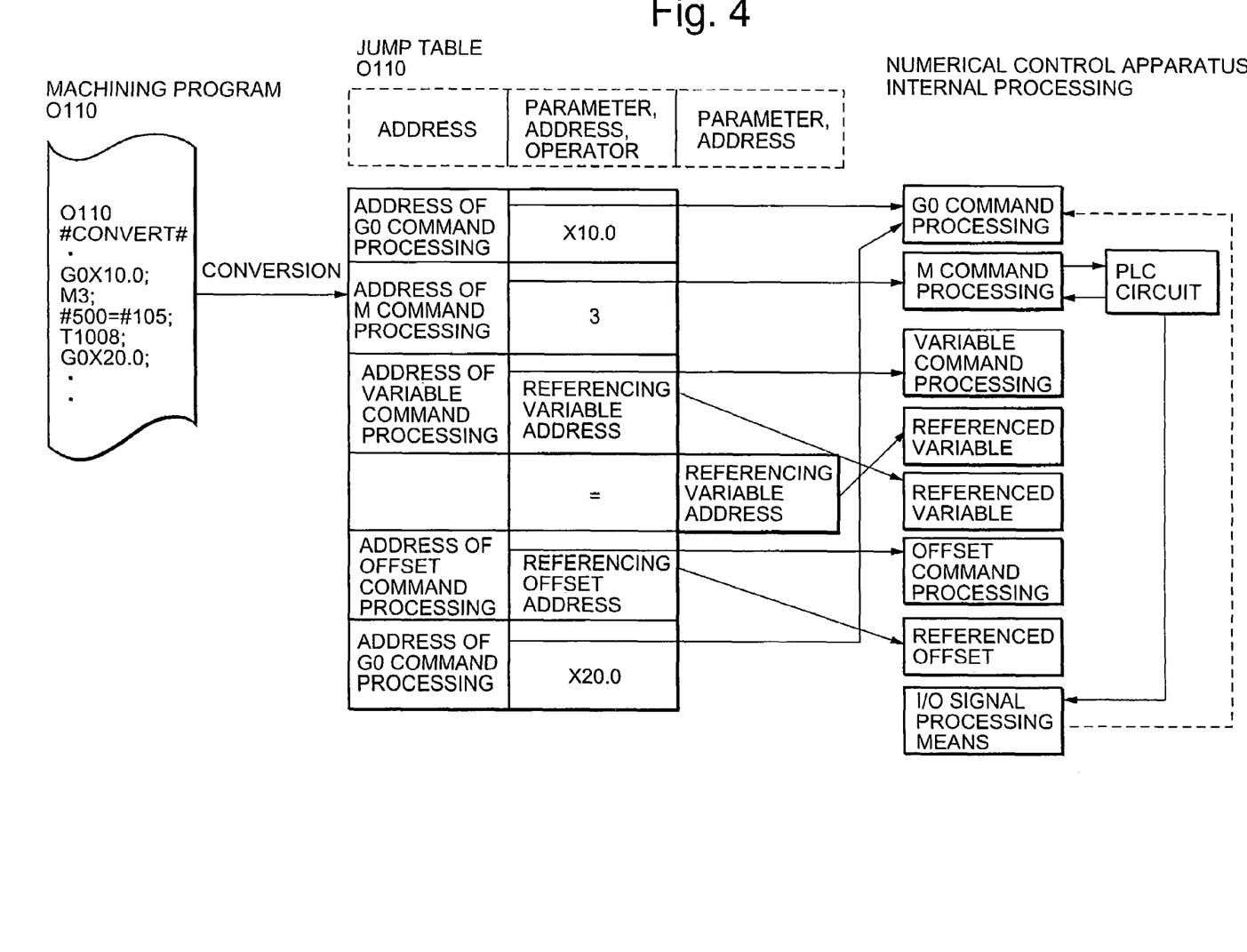
FIG. 4 is a diagram illustrating details of converted data according to Embodiment 1 of the present invention.
Figure 5:
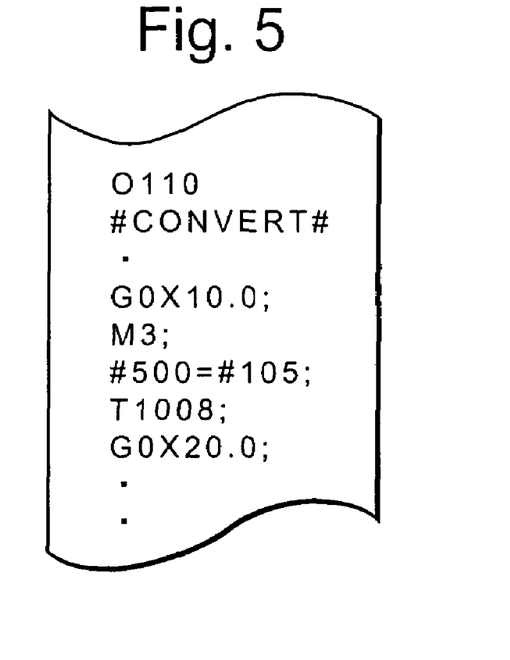
FIG. 5 is a diagram illustrating an example of a machining program to be converted, according to Embodiment 1 of the present invention.
Figure 6:
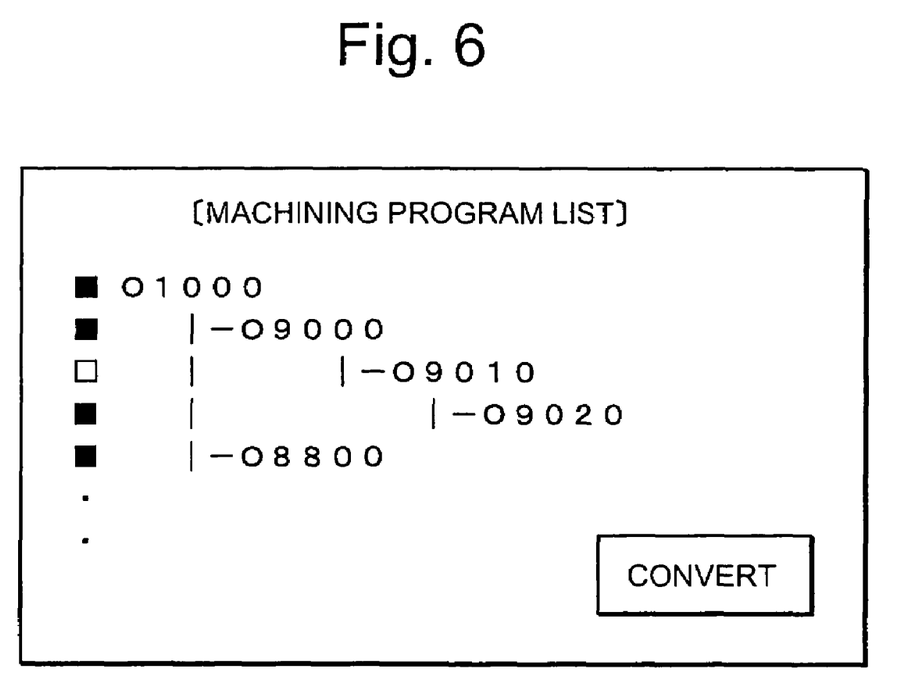
FIG. 6 is a diagram illustrating an example of displaying a machining program list for selecting machining programs to be converted, according to Embodiment 1 of the present invention.
Figure 7:
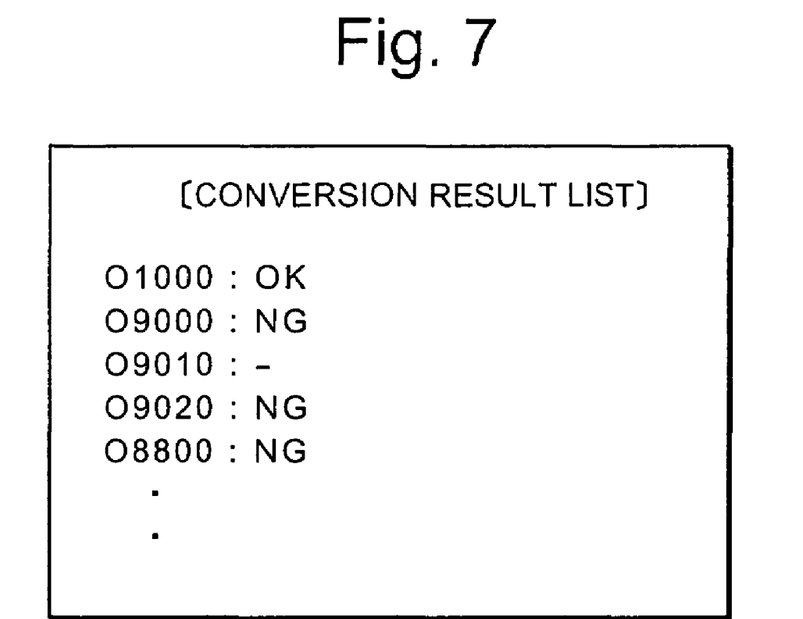
FIG. 7 is a diagram illustrating an example of displaying a conversion result list according to Embodiment 1 of the present invention.
Figure 8:
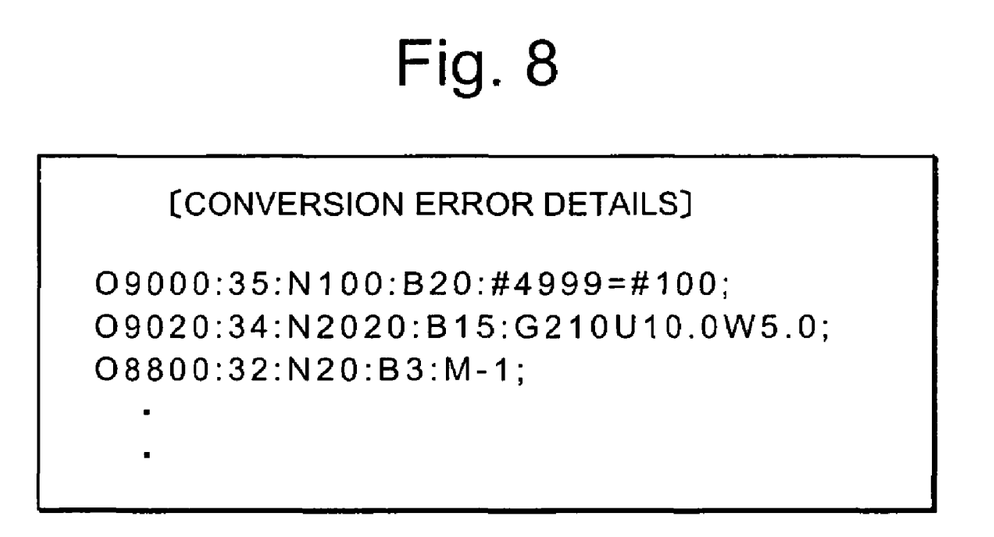
FIG. 8 is a diagram illustrating an example of displaying detailed contents when conversion errors occur according to Embodiment 1 of the present invention.
Figure 9:
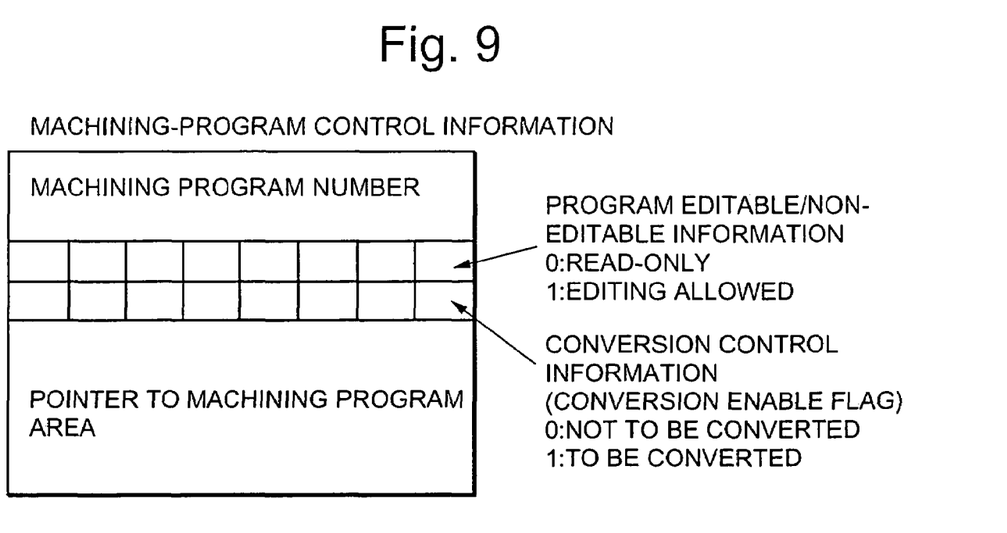
FIG. 9 is a diagram illustrating machining-program control information according to Embodiment 1 of the present invention.
Figure 10:
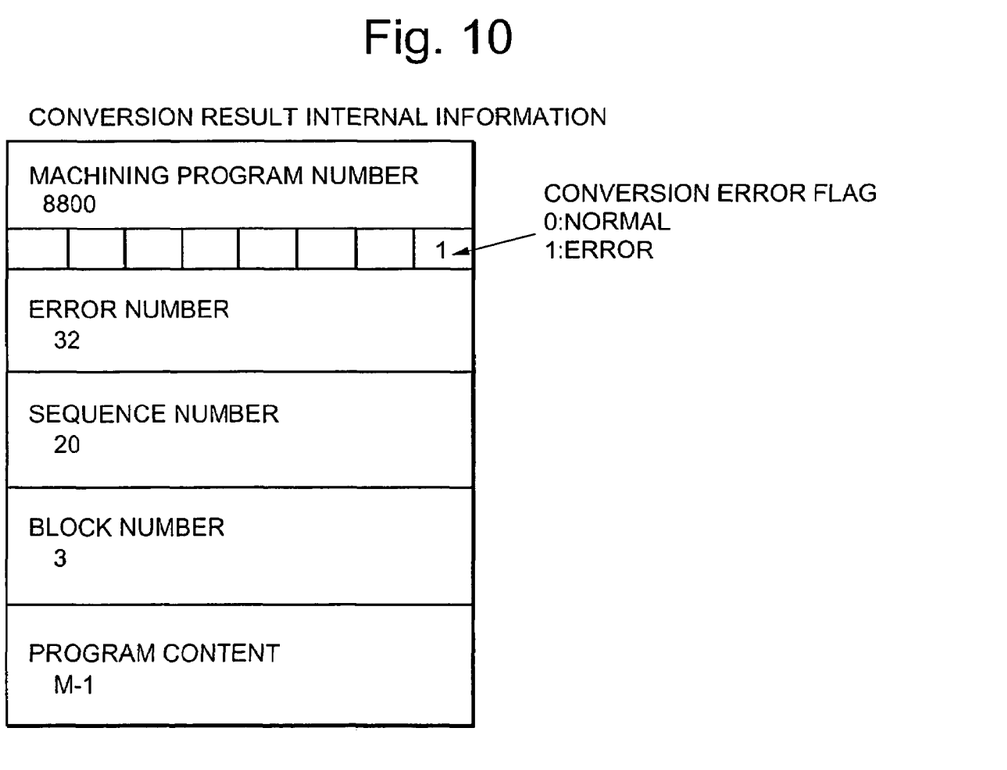
FIG. 10 is a diagram illustrating conversion-result internal information according to Embodiment 1 of the present invention.
Figure 11:
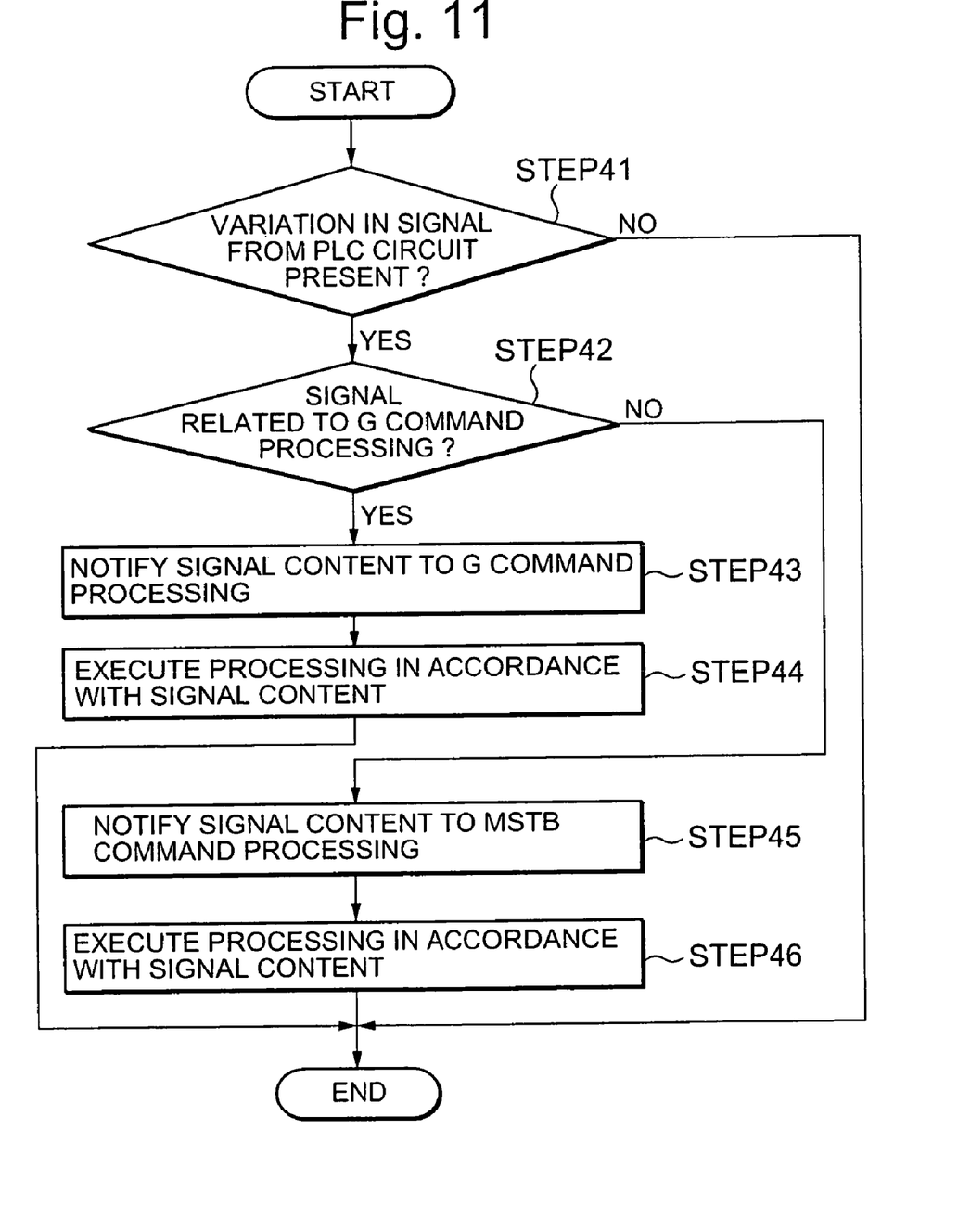
FIG. 11 is a flowchart illustrating procedures for executing converted data in a case in which an operator changes operation conditions during the machining operation according to Embodiment 1 of the present invention.

FIG. 1 is a block diagram illustrating key components of a numerical control apparatus 101 having a machining-program conversion function according to the present Embodiment 1; FIG. 2 is a flowchart illustrating procedures for converting a machining program; FIG. 3 is a flowchart illustrating procedures for executing converted data during a machining operation; FIG. 4 is a diagram illustrating details of converted data registered in a memory 601; FIG. 5 is a diagram illustrating an example of describing a machining program to be converted; FIG. 6 is a diagram illustrating an example of setting for each program information on whether to be converted or not; FIG. 7 is a diagram illustrating an example of displaying conversion results; FIG. 8 is a diagram illustrating an example of displaying detailed contents when conversion errors occur; FIG. 9 is a diagram illustrating machining-program control information; FIG. 10 is a diagram illustrating detailed internal information on a conversion result; and FIG. 11 is a flowchart illustrating procedures for executing converted data in a case in which an operator changes operation conditions during the machining operation.

In FIG. 1, numeral 101 denotes the numerical control apparatus, which includes an analyzing section 103, an interpolation processing section 104, a machine control signal processing section 106, a PLC circuit 105, an NC shaft control section 180, a main-shaft control section 110, a data input/output circuit 120, the memory 107, a parameter setting section 108, and a screen processing section 109.

Moreover, the numerical control apparatus 101 is connected to a servo drive unit 201 via the data input/output circuit 120 to drive an NC shaft 204. Furthermore, the numerical control apparatus is connected to a main-shaft drive unit 301 via the data input/output circuit 120 to drive a main shaft 304.

A machining program 102, which has been read in from a tape reader or the like, is stored in a machining program area 601 in the memory 107. Next, usually by the analyzing section 103, the machining program stored in the machining program area 601 is read out block by block from the memory 107 and analyzed block by block. Program codes analyzed block by block are given to the interpolation processing section 104, to perform, according to instructions, interpolation control, main-shaft control, auxiliary function control, or the like, with respect to each block.

The NC shaft control section 180 performs control for positioning, interpolation feeding, or the like, according to the interpolation data, with respect to the NC shaft 204. The main-shaft control section 110 performs control for carrying out operations on the commanded main shaft, such as rotation at a commanded rotational frequency, stop, and an orientation operation.

A servo drive unit 201 is connected to a servo motor 202, which drives NC shaft 204 via a gear, a ball screw and the like by means of positional control according to positional feedback from the detector 205.

Moreover, the main-shaft drive unit 301 is connected to a main-shaft motor 302 via a gear and the like to drive the main shaft 304. The main shaft 304 is equipped with a detector 305. The main-shaft drive unit 301 controls orientation operation of the main-shaft motor 302 according to positional data inputted from the detector 305.

The above-described configuration and operation are the configuration and operation of a general numerical control apparatus. According to Embodiment 1 of the present invention, components explained next for converting the machining program 102 are added to the configuration of a general numerical control apparatus. In addition, details of each component explained next will be described using diagrams in FIG. 2 and thereafter.

Specifically, a conversion data judging means 401 is added to the analyzing section 103.

Moreover, the interpolation processing section 104 is further equipped with a conversion data executing means 900, a power-on machining-program-conversion activating means 901, G command processing units 902, MSTB command processing units 903, variable command processing unit 904, and offset command processing unit 905.

Furthermore, a machining-program conversion processing section 501 is added to the numerical control apparatus 101. The machining-program conversion processing section 501 is composed of a machining-program/internal-processing conversion means 502, a conversion-target-program judging means 503, and a variable/offset conversion means 504.

Moreover, a conversion data registration area 603 is added in the memory 107.

Furthermore, a conversion program selecting means 701 is added to the parameter setting section 108.

Moreover, a conversion result listing means 801 and a conversion error display means 802 are added to the screen processing section 109.

Moreover, a machining-program-conversion activating means 1002, an I/O signal notifying means 1003, and an MSTB command executing means 1004 are added to the machine control signal processing section 106.

In Embodiment 1 of the present invention, above-described components are added to the configuration of a general numerical control apparatus.

Next, procedures for converting the machining program 102 will be described using the flowchart in FIG. 2.

The conversion mentioned here, which will be made clear by later-described explanation, does not convert a machining program into interpolation-processed control data as described in, for example, the specification of International Publication Number: WO01-44882 A1. Instead, after analyzing a machining program, if a command in the machining program is a G code or an MSTB command, then a numerical-control-apparatus internal-processing address and a parameter for the machining-program command are stored in a table provided in the memory, and meanwhile, if the command in the machining program is a variable or an offset command, then the numerical-control-apparatus internal-processing address and a numerical-control-apparatus referencing address are stored in the table provided in the memory.

In step 1, the power-on machining-program-conversion activating means 901 in the interpolation processing section 104 determines whether the numerical control apparatus 101 is performing the power-on operation or not, as described below. Firstly, the power-on machining-program-conversion activating means 901 has been registered in advance as a portion of initialization processing of the interpolation processing section 104. The initialization processing is activated by the operating system as a subroutine, and is activated only a single time during the power-on operation of the numerical control apparatus 101. Therefore, the power-on machining-program-conversion activating means 901 is activated only a single time during the power-on operation of the numerical control apparatus 101. For this reason, whether or not the numerical control apparatus 101 is performing the power-on operation is detected based on whether the power-on machining-program-conversion activating means 901 is activated or not.

Then, when the system is performing the power-on operation, the power-on machining-program-conversion activating means 901 activates the machining-program conversion processing section 501, and step 4 ensues. Meanwhile, when the power-on machining-program-conversion activating means 901 is not activated, the system is not performing the power-on operation, and step 2 ensues.

In step 2, the machining-program-conversion activating means 1002 checks a conversion request signal from the PLC circuit 105. The conversion request signal is defined as one of I/O signals handled in the same way as normally-used signals such as automatic activation and NC reset, and is exchanged between the PLC circuit 105 and the machine control signal processing section 106. If the conversion request signal is on, the machining-program-conversion activating means 1002 activates the machining-program conversion processing section 501, and step 4 ensues. Meanwhile, if the conversion request signal is off, more specifically, if the conversion request signal is not inputted, then step 3 ensues.

In step 3, the conversion program selecting means 701 checks conversion request by operator's manipulation. Specifically, the check is performed as follows. Firstly, the screen processing section 109 displays on the display for the numerical control apparatus 101 a machining program list of the machining programs 601 registered in the memory 107, in such a format as illustrated in FIG. 6. In addition, in FIG. 6, O110 denotes the number of the highest-level machining program, which is generally a machining program that is automatically activated at starting by the operator, more specifically, a machining program for machining a product. O9000 and O8800 are machining programs that are called from O110, and referred to as subprograms, Moreover, a subprogram O9010 called from O9000, and a subprogram O9020 called from O9010 are sequentially displayed with their number. Furthermore, before each machining program number (on the extreme left) a check box is displayed. The operator enables check boxes corresponding to machining programs that the operator desires to convert (■ is displayed for conversion ON in FIG. 6). When the operator enables a check box, the conversion program selecting means 701 turns on (sets to "1") conversion control information in the machining program control information registered in the memory 107 as illustrated in FIG. 9. In the example in FIG. 9, the machining program control information is composed of a machining program number, program editable/non-editable information, conversion control information, and a pointer to the machining program area. Here, the program editable/non-editable information is used as information indicating whether editing of the machining program is allowed. For example, when the program editable/non-editable information is ON (bit information "1"), the machining program is in a state in which both writing and reading are allowed (editing is allowed). When the program editable/non-editable information is OFF (bit information "0"), the machining program is in a read-only state in which only reading is allowed (non-editable state). In the present Embodiment 1, the conversion control information (conversion enable flag) is added to the machining program control information. The conversion enable flag is turned on by the above-described conversion program selecting means 701. More specifically, when the conversion enable flag is on (bit information is "1"), the program is to be converted; and meanwhile, when the conversion enable flag is off (bit information is "0"), the program is not to be converted. Then, the operator presses a conversion execution menu button displayed in the lower right portion in FIG. 6. The conversion program selecting means 701 receives an operator's conversion request, and activates the machining-program conversion processing section 501. Then step 4 ensues. Meanwhile, if no operator's conversion request is present, the processing is terminated.

In step 4, the machining-program conversion processing section 501 activated by the power-on machining-program-conversion activating means 901, the machining-program-conversion activating means 1002, or the conversion program selecting means 701 starts the conversion processing of the machining programs. Specifically, the conversion processing is a loop process, and firstly, the conversion-target-program judging means 503 checks whether the loop process is completed. More specifically, a machining program registered in the memory 107 is read out, and then, if no machining program to be read out next is left, step 9 ensues. When a machining program to be read out next is present, step 5 ensues.

In step 5, the conversion-target-program judging means 503 checks the above-described conversion control information or the content of the machining program (one block at the head). Specifically, the above-described conversion control information is read out, and whether the conversion enable flag is ON (bit information is "1") is checked. Meanwhile, in a case in which the content of the machining program is checked, as illustrated in FIG. 5, a character string "#CONVERT#" has been firstly written in advance in the first block of the machining program. The character string is usually inserted at the head of the machining program using an editing function of the numerical control apparatus 101. The conversion-target-program judging means 503 reads out the first block of the machining program, and checks for the character string "#CONVERT#". If the conversion enable flag is ON, or the character string "#CONVERT#" is present in the first block of the machining program, the conversion-target-program judging means 503 notifies the machining-program/internal-processing conversion means 502 of a conversion request, and step 6 ensues. If the conversion enable flag is OFF, or the character string "#CONVERT#" is not present in the first block of the machining program, step 4 ensues, and the processing is repeated.

In step 6, the machining-program/internal-processing conversion means 502 receives notification from the conversion-target-program judging means 503, reads out the machining program judged to be converted, and writes the machining program number information in the conversion data registration area 603 in the memory 107.

The conversion will be described using FIG. 4. A machining program to be converted is illustrated in the far left of FIG. 4. The program number is "O110". "G0X10.0;" is a positioning command, and indicates movement to the position 10.0 mm along the X-axis. The machining-program/internal-processing conversion means 502 writes in the conversion data registration area 603, with respect to the command, the pointer (start address) to G0 command processing unit among the G command processing units 902, which are application programs in the interpolation processing section 104. In addition, "X10.0" is written in the conversion data registration area 603 as a parameter of the G0 command processing unit. Here, the pointer to (the start address of) the G0 command processing unit is calculated as follows. Specifically, symbol information on application programs (G0 command processing unit, M command processing unit, variable command processing unit, and the like) for the numerical control apparatus 101 are generally registered in the operating system. The jump address for an application program, in other words, the start address of the application program is registered in the symbol information. A process for reading the symbol information is prepared in the operating system. The machining-program/internal-processing conversion means 502 can obtain the start address of the target application program by calling the process in the operating system. Thus the machining-program/internal-processing conversion means 502 can write in the conversion data registration area 603 the start address of the G0 command processing unit obtained by the process in the operating system. Although G0 has been explained here, the start address of the processing unit for other commands such as G1 (cutting feed command) and G2/G3 (arc commands) can be also obtained in the same manner as described above. The start address can be written in the conversion data registration area 603 together with its parameter. In the example in FIG. 4, with respect to "G0X20.0" command, the same start address of the G0 command processing unit as "G0X10.0" command and a parameter "X20.0" are written in the conversion data registration area 603. Here, in case of G0, because feed rate information has been registered as a parameter (in the memory 107), the machining-program/internal-processing conversion means 502 does not register the feed rate information as a parameter in the conversion data registration area 603. Meanwhile, in case of G1 (or G2, G3, or the like), because feed rate information is given by the machining program command, the machining-program/internal-processing conversion means 502 registers the feed rate information as a parameter in the conversion data registration area 603.

Next, the machining-program/internal-processing conversion means 502 reads in "M3" command, and then the start address of the M command processing among the MSTB command processing units 903 and a parameter "3" are written in the conversion data registration area 603. Here, "M3" command in FIG. 4 is a command to be notified to the PLC circuit 105, and is one of the commands related to machine operations. M3 usually indicates a normal rotation command for the main shaft. Other M commands include a reverse rotation command for the main shaft, a stop command, and a cutting oil on/off command, and handle signals related to machine control. Although the explanation above has been made for M commands, with regard to other STB commands, the machining-program/internal-processing conversion means 502 writes in the same manner into the conversion data registration area 603 the start address of the S command processing unit and its parameter, the start address of the T command processing unit and its parameter, and the start address of the B command processing unit and its parameter. Here, the S command is a command for instructing the rotational speed of the main-shaft motor 302. For example, "S1000" means to rotate the main-shaft motor 302 at 1000 rpm. The machining-program/internal-processing conversion means 502 registers for this command in the conversion data registration area 603 the address of the S command processing and its parameter "1000". Meanwhile, the T command is a command for changing tools. For example, "T1008" means that the higher-order two digits express the tool number, which indicates, in this case, that the tool No. 10 is selected. Incidentally, the lower-order two digits "08" indicate the tool offset number, which will be described later. The machining-program/internal-processing conversion means 502 registers for the command in the conversion data registration area 603 the address of the T command processing unit and its parameter "10". The B command is referred to as a second auxiliary function command, and performs machine control in the same manner as the M command. The machining-program/internal-processing conversion means 502 registers for the command in the conversion data registration area 603 the address of the B command processing unit and its parameter.

Next, "#500=#105" command is read in by the variable/offset conversion means 504. #500 and #105 indicate a variable command. "#500=#105" means that the value of #105 is assigned to #500. In most cases, variable values are rewritten by the machining program, or rewritten by the operator, during machining program execution, so that values designated in a variable setting screen cannot be converted in advance during conversion to be registered in the conversion data registration area 603.

Therefore, the conversion of a variable is performed by registering in the conversion data registration area 603 the address of a variable table in which the variable value is actually stored. In addition, in most cases, variables are written together with an operation command or an assignment command. Accordingly, a portion of area for describing a variable operation is provided in the conversion data registration area 603, and if an operation is present, the symbol of the operator is written. For example, in the example in FIG. 4, with respect to the command "#500=#105", firstly the start address of the variable command processing unit 904 is registered in the first table column. The referencing address of the variable #105 is registered in the second table column. Next, the conversion of #500 will be described. The start address of the variable command processing unit 904 has just been registered, so that nothing is registered in the first table column. Next, the operator is registered in the second table column. In this case, a symbol "=", which indicates an assignment statement, is registered. The referencing address of the variable #500 is registered in the third table column.

Next, calculation of a referencing address of a variable will be described. Variables handled in the numerical control apparatus 101 have been allocated to fixed areas in the memory 107. In the numerical control apparatus 101, two types of variables—"#100 through #199", and "#500 through #599"—are present, which have been allocated to the fixed areas in the memory 107. For instance, the start address of the area for "#100 through #199", or specifically, the address of #100 is determined to be "0xa806c000", and the start address of the area for "#500 through #599", or specifically, the address of #500 is determined to be "0xa806d000". Therefore, the referencing address of a variable can be calculated from the value of the variable number. Because the size of a variable is usually 4 bytes, in case of the variable #105, the address is calculated as "0xa806c000+4×5=0xa806c014". In case of the variable #500, the address is calculated as "0xa806d000+4×0=0xa806d000".

Next, the variable/offset conversion means 504 reads in "T1008". The command in the lower-order two digits "08" indicates the tool offset number as described previously. In most cases, values of tool offsets just like variables are rewritten by the machining program, or rewritten by the operator, during the machining program execution, so that offset values designated in the variable setting screen cannot be converted in advance during conversion to be registered in the conversion data registration area 603. Therefore, tool-offset conversion is performed by registering in the conversion data registration area 603 the address of a tool offset table in which the tool offset value is actually stored. More specifically, the variable/offset conversion means 504 writes, with respect to the command, the start address of the offset command processing unit 905 within the interpolation processing section 104 into the conversion data registration area 603, then writes the referencing address of the offset into the conversion data registration area 603.

The referencing offset address is calculated as follows. The tool offset data has been allocated to a fixed area in the memory 107 in the numerical control apparatus 101. For example, in case of "T8", given that the start address of the tool offset data (the address of "T1") is "0xa806e000", the referencing offset address can be calculated from the tool offset number. Because the offset size is usually 4 bytes, in this case, the address is calculated as "0xa806e000+4×(8−1)=0xa806e01c", which is registered in the conversion data registration area 603.

By repeating the above-described processing, a machining program can be converted into an application program in the numerical control apparatus 101.

In step 7, when the conversion is completed normally, the machining-program conversion processing section 501 writes the machining program number and the conversion error flag "0" in conversion-result internal information illustrated in FIG. 10, within the conversion data registration area 603 in the memory 107, and then step 4 recurs, to repeat the processing. Meanwhile, when the machining program includes description errors, the conversion cannot be completed and results in error. In this case, the machining-program conversion processing section 501 writes "1" in the conversion error flag within the conversion data registration area 603 in the memory 107, and further writes the conversion error content in the conversion data registration area 603. Specifically, as illustrated in FIG. 10, the machining program number, the conversion error flag, an error number, an error occurrence sequence number, an error occurrence block number, and an error occurrence program content are written. The conversion error flag is bit information as described above, in which "0" means normal completion, and "1" means error occurrence. When the conversion is completed normally, the machining program number and the conversion error flag ("0") are written. When a conversion error occurs, in the example in FIG. 10, the machining program number "8800", the conversion error flag "1", the error number "32", the sequence number "20", the block number "3", and the program content "M−1" are written in the conversion-result internal information. Here, the error number "32" means an invalid address.

In step 8, the conversion error display means 802 checks the conversion error flag in the conversion-result internal information, and displays the result on the display in such a form as illustrated in FIG. 8. In FIG. 8, the error occurrence machining program number, the error number, the error occurrence sequence number, the error occurrence block number, and the error occurrence program content are displayed in this order from the left. In FIG. 8, an error of O9000 is displayed in the first line; an error of O9020 is displayed in the second line; and an error of O8800 is displayed in the third line.

In step 9, the conversion result listing means 801 checks the conversion error flag in the conversion-result internal information, and displays the result on the display in such a form as illustrated in FIG. 7. The display format illustrates the machining program number, and the converted data status "normal"/"error"/"not to be converted". In FIG. 7, it is displayed that O110 is normal, O9000 is error, O9010 is not to be converted, O9020 is error, and O8800 is error. The operator can check the conversion results from the above-described two types of information (screen) displayed in the display.

Next, procedures for executing the converted data will be described using the flowchart in FIG. 3.

In step 21, the conversion data judging means 401 firstly reads out the machining program number from the memory 107.

In step 22, the conversion data judging means 401 compares the above-described machining program number that has been read out from the memory 107 with the machining program numbers in the conversion data registration area 603. When the present machining program number does not exist in the conversion data registration area 603, step 31 ensues, and the normal machining program 601 registered in the memory 107 is executed in a conventional manner. When the present machining program number exists in the conversion data registration area 603, the conversion data judging means 401 requests the conversion data executing means 900 to execute the converted data for the present machining program number, and step 23 ensues.

In step 23, the conversion data executing means 900 checks the completion of executing the converted data for the present machining program number. This is because the execution processing is a loop process. The completion of the execution is determined based on whether the converted data in the jump table for the present machining program number is executed up to the end. If the execution has been completed, the processing is ended. If the execution has not been completed, step 24 ensues.

In step 24, if the jump table data in the conversion data registration area 603 is one of the addresses of the G command processing units 902, step 25 ensues. If the jump table data is not any of the addresses of the G command processing units 902, step 27 ensues.

In step 25, the conversion data executing means 900 pushes the parameter for the processing unit among the G command processing units 902 on the stack, sets in the program counter the address of the processing unit among the G command processing units 902, and calls the processing unit among the G command processing units 902.

In step 26, to give an explanation according to the example of FIG. 4, the G0 command processing unit calculates the end point coordinate from the parameter ("X10.0"), and performs positioning. Here, in the case of G0, information regarding the feed rate is designated according to the parameter (registered in the memory 107), so that the G0 command processing unit reads out the feed rate data from the parameter. Specifically, using shifting distances of the control shaft (X-axis) and the feed rate data that has been read out as above, shifting distances per unit time, in short, interpolated shifting distances are calculated. The interpolated shifting distances are generated as values corresponding to the rate. In addition, the interpolated shifting distances are calculated as shifting distances per unit time so as to describe a predetermined acceleration/deceleration profile based on the profile designated in advance by the parameter and on the time constant. Meanwhile, in the case of G1 (or G2, G3, or the like) command, information regarding the feed rate is given as a parameter in the conversion data registration area 603 as described above, so that the G1 command processing unit calculates shifting distances per unit time, in short, the interpolated shifting distances from the feed rate data in the parameter. The interpolated shifting distances are generated as values corresponding to the rate likewise as in G0. In addition, the interpolated shifting distances are calculated as shifting distances per unit time so as to describe a predetermined acceleration/deceleration profile based on the profile designated in advance by the parameter and on the time constant. After the processing is completed, step 23 recurs to repeat the processing.

In step 27, if the jump table data in the conversion data registration area 603 is the address of the MSTB command processing, step 28 ensues. If the jump table is not the address of the MSTB command processing, step 30 ensues.

In step 28, the conversion data executing means 900 pushes the parameter for one of the MSTB command processing units 903 on the stack, sets the one of the addresses of the MSTB command processing units 903 to the program counter, and calls the one of the MSTB command processing units 903.

In step 29, to give an explanation according to the example in FIG. 4, in the case of M3 command, based on the parameter "3" (M-number 3), the M command processing unit among the MSTB command processing units 903 sets in the interface with the PLC circuit 105 the M-number "3" and a strobe signal via the MSTB command execution means 1004 in the machine control signal processing section 106. The strobe signal is a signal for notifying the PLC circuit 105 of the M command, the S command, the T command, or the B command. Next, the PLC circuit 105 detects the strobe signal, and recognizes that the M command has been analyzed. Then, the processing corresponding to the M-number that has been set in the interface, in short, the machine sequence processing is performed. For instance, because M3 indicates the main-shaft normal rotation, the PLC circuit 105 determines whether the main shaft is ready for rotation (for instance, whether the chuck is closed, and the like), and if the main shaft is ready for rotation, the PLC circuit sets in the interface the main-shaft normal-rotation signal and a completion signal for notifying completion of the M command processing. The MSTB command execution means 1004 detects the completion signal, and then notifies the M command processing unit among the MSTB command processing units 903 of information on the main-shaft normal rotation command. The M command processing unit receives the notification from the MSTB command execution means 1004, and then outputs the normal-rotation signal for the main-shaft motor 302 via the main-shaft control section 110 and the data input/output circuit 120 to the main-shaft drive unit 301, to rotate the main-shaft motor 302. When the processing is completed, step 23 recurs to repeat the processing. In the description above, the M command has been described. However, other commands, namely, the B command, the S command, and the T command are processed in the same manner.

In step 30, in the case of the address of the variable command processing unit 904, the conversion data executing means 900 pushes the following referencing variable address on the stack as a parameter for the variable command processing unit 904. Moreover, when reading out the next jump table data, if the address of the processing unit is empty, the subsequent operator or the referencing variable address is pushed on the stack as a parameter for the variable command processing unit 904. Furthermore, when reading out the next jump table data, if the address of the processing unit is not empty, the address of the previous variable command processing unit 904 is set in the program counter, and the variable command processing unit 904 is called. To give an explanation according to the example in FIG. 4, "#500=105" indicates that the actual variable value is read out according to the referencing variable address of #105 by the variable command processing unit 904. Next, the operator "1=" and "#500" are determined to be an assignment to #500, and the value of the variable #105, which has been actually read out, is written into #500, retrieved from the referencing variable address of #500.

In the case of the address of the offset command processing unit 905, the conversion data executing means 900 pushes the subsequent referenced offset address on the stack as a parameter for the offset command processing unit 905, and then calls the offset command processing unit 905. To give an explanation according to the example in FIG. 4, in the case of "T1008", the actual offset value is read out according to the referencing offset address for the offset number "08", and the machine coordinate value is altered by the offset value. When the processing in step 30 is completed, step 23 recurs to repeat the processing.

At the last, conversion data executing procedures in which operation conditions are varied due to working by a system operator during the execution of the converted data will be described using the flowchart in FIG. 11.

Firstly, in step 41, the I/O signal notifying means 1003 monitors variations in the signal from the PLC circuit 105. For example, when the operator manipulates a speed override dial, the PLC circuit 105 reads in the dial value of the speed override dial, and sets the value as an override value in the above-described interface. In addition, when the operator turns on an MSTB lock switch, the PLC circuit 105 detects the status of the switch, and sets an MSTB lock signal in the above-described interface. These are taken as signal variations by the I/O signal notifying means 1003.

In step 42, the I/O signal notifying means 1003 detecting signals related to the G command processing. The detecting of the signals related to the G command processing is performed by pre-classifying I/O signals into categories such as G-command-processing related signals, and pre-registering them to the memory 107, and by consulting the registered information. If the signal is a G-command-processing related signal, then step 43 ensues, and if the signal is not a G-command-processing related signal, then step 45 ensues.

In step 43, the I/O signal notifying means 1003 notifies the target G command processing of the content of the signal. For example, to give an explanation according to FIG. 4, when the operator manipulates the speed override dial from 100% to 50% during the execution of "G0X10.0", the speed override value from the PLC circuit 105 varies from 100% to 50%. The I/O signal notifying means 1003 inquires for the processing that is currently being executed of the conversion data executing means 900. The conversion data executing means 900 notifies the I/O signal notifying means 1003 of the processing that is currently being executed. In this case, it is notified that the G0 command processing is being executed. The I/O signal notifying means 1003 receives the notification from the conversion data executing means 900, and then notifies the G0 command processing that the speed override value has varied from 100% to 50%. In the example of FIG. 4, the dashed arrow corresponds to the notification.

In step 44, when the G0 command processing receives the speed-override-value change notification from the I/O signal notifying means 1003, the G0 command processing generates the interpolated shifting distances again as values corresponding to the commanded speed (in this case, speed data of 50% or half). In addition, the interpolated shifting distances are recalculated as shifting distances per unit time based on the profile designated in advance by parameters, and on the time constant, so as to describe a predetermined acceleration/deceleration profile.

In step 45, the I/O signal notifying means 1003 notifies the target MSTB command processing unit of the content of the signal. For instance, to give an explanation according to the example in FIG. 4, if the operator turns on the MSTB lock operation switch, the MSTB lock signal is notified via the PLC circuit 105 to the I/O signal notifying means 1003. Because the MSTB lock signal is a signal meaning that MSTB commands are not executed, the I/O signal notifying means 1003 notifies the M command processing unit, the S command processing unit, the T command processing unit, and the B command processing unit that the MSTB lock signal has been inputted.

In step 46, the M command processing unit receives the notification of the MSTB lock signal from the I/O signal notifying means 1003, and then changes its internal state so as not to execute the signal processing from the next M command onward. To give an explanation according to the example in FIG. 4, even if the M command processing unit is called by the M3 command, which is the main-shaft normal rotation command, the signal for rotating the main shaft will not be transmitted to the main-shaft drive unit 301.

Embodiment 2

Although the system in which the entire processing is performed in the numerical control apparatus has been described in the above-described Embodiment 1, some portion of the processing may be processed outside the numerical control apparatus.

For example, the machining-program conversion processing section 501 may be provided in a PC (personal computer), so that the above-described conversion processing can be performed in the PC before the machining program is run, to store the converted data via a communication line in the conversion data registration area 603 in the main body of the numerical control apparatus.

Moreover, in a case of a PC-NC, in which some portion of the processing of the numerical control apparatus (NC), such as a display process, is performed in the PC, the above-described conversion processing may be performed in the PC before the machining program is run, to store the converted data via a two-port RAM in the conversion data registration area 603 in the main body of the numerical control apparatus.

Furthermore, the system may be configured so that the machining-program conversion processing section 501 and the conversion data registration area 603 are provided in the PC, and the above-described conversion processing is performed in the PC before the machining program is run, and the converted data is stored in the conversion data registration area 603 provided in the PC side; and meanwhile, a buffer memory is prepared in advance in the NC main-body side, and by sending, during a run of the machining program, the converted data stored in the PC-side conversion data registration area 603 via a communication line or a two-port RAM to the buffer memory provided in the NC main-body side, the internal processing unit (application program) in the numerical control apparatus main body is executed.

Moreover, the conversion program selecting means 701, the conversion result listing means 801, the conversion error display means 802, or the like may be provided in the PC side as required.

INDUSTRIAL APPLICABILITY

As described above, the numerical control system relevant to the present invention is suitable to be used for a numerical control system that is operated at high speed during a run of the machining program.

The invention claimed is:

1. A numerical control system comprising:
  a conversion means for pre-generating data for allocating commands in a machining program to an internal processing unit of a numerical control apparatus, and for storing the data in memory; and
  a conversion data executing means for using the data generated by the conversion means and pre-stored in the memory to directly execute the internal processing unit in sequence, without performing processing for allocating the commands in the machining program to the internal processing unit of the numerical control apparatus, when the machining program is executed to control a control object,
  wherein for at least one of a G code machining program command and an auxiliary function, main axis function, tool function, and second auxiliary function (MSTB) machining program command, the conversion means stores in a table provided in memory a numerical-control-apparatus internal processing unit address and a parameter, for said machining-program command.

2. A numerical control system according to claim 1, further comprising a conversion data judging means for judging, during a run of the machining program, whether converted data is present, and for requesting the conversion data executing means to execute the converted data if the converted data is present.

3. A numerical control system according to claim 1, further comprising:
  a conversion program selecting means for displaying on a display a machining program list and selecting a program to be converted from the machining program list; and
  a conversion-target-program judging means for referring to the program selected by the conversion program selecting means, and for requesting the conversion means to convert only machining programs that include a conversion-enable instruction.

4. A numerical control system according to claim 1, further comprising a conversion result listing means for displaying on a display conversion results as a list.

5. A numerical control system according to claim 1, further comprising a conversion error display means for displaying on a display detailed information on conversion errors.

6. A numerical control system according to claim 1, further comprising a power-on machining-program-conversion activating means for activating the conversion means at system power-on.

7. A numerical control system according to claim 1, further comprising a machining-program-conversion activating means for activating the conversion means by input of a programmable logic controller (PLC) signal.

8. A numerical control system according to claim 1, further comprising an I/O signal notifying means for detecting a system-operator-working signal, and notifying the internal processing unit of a condition in accordance with a content of the signal.

9. A numerical control system according to claim 8, further comprising a conversion data judging means for judging, during a run of the machining program, whether converted data is present, and for requesting the conversion data executing means to execute the converted data if the converted data is present.

10. A numerical control system according to claim 8, further comprising:
  a conversion program selecting means for displaying on a display a machining program list and selecting a program to be converted from the machining program list; and
  a conversion-target-program judging means for referring to the program selected by the conversion program selecting means, and for requesting the conversion means to convert only machining programs that include a conversion-enable instruction.

11. A numerical control system according to claim 8, further comprising a conversion result listing means for displaying on a display conversion results as a list.

12. A numerical control system according to claim 8, further comprising a conversion error display means for displaying on a display detailed information on conversion errors.

13. A numerical control system according to claim 8, further comprising a power-on machining-program-conversion activating means for activating the conversion means at system power-on.

14. A numerical control system according to claim 8, further comprising a machining-program-conversion activating means for activating the conversion means by input of a programmable logic controller (PLC) signal.

15. A numerical control system comprising:
  a conversion module that pre-generates data for allocating commands in a machining program to an internal processing unit of a numerical control apparatus, and stores the data in memory; and
  a conversion data executing module that uses the data generated by the conversion module and pre-stored in the memory to directly execute the internal processing unit in sequence, without performing processing for allocating the commands in the machining program to the internal processing unit of the numerical control apparatus, when the machining program is executed to control a control object,
  wherein for at least one of a G code machining program command and an auxiliary function, main axis function, tool function, and second auxiliary function (MSTB) machining program command, the conversion module stores in a table provided in memory a numerical-control-apparatus internal processing unit address and a parameter, for said machining-program command.

16. A numerical control system comprising:
  a machining-program/internal-processing conversion module that stores in a table in memory a first numerical-control-apparatus internal processing unit address and a parameter, for at least one of a G code machining program command and an MSTB machining program command;
  a variable/offset conversion module that storing in the table in the memory a second numerical-control-apparatus internal processing unit address and a numerical-control-apparatus referencing address, for at least one of a variable machining program command and an offset machining program command; and a conversion data executing module for using data generated, and pre-stored in the memory, by the machining-program/internal-processing conversion module and the variable/offset conversion module, to directly execute the internal processing units in sequence, without performing processing for allocating commands in the machining program to internal processing units of the numerical control system, when the machining program is executed to control a control object.

17. A numerical control system comprising:

a conversion means for pre-generating data for allocating commands in a machining program to an internal processing unit of a numerical control apparatus, and for storing the data in memory; and a conversion data executing means for using the data generated by the conversion means and pre-stored in the memory to directly execute the internal processing unit in sequence, without performing processing for allocating the commands in the machining program to the internal processing unit of the numerical control apparatus, when the machining program is executed to control a control object, wherein for at least one of a variable machining program command and an offset machining program command, the conversion means stores in a table provided in memory a numerical-control-apparatus internal processing unit address and a numerical-control-apparatus referencing address.

18. A numerical control system comprising:

a machining-program/internal-processing conversion means for setting and storing in a table provided in memory a first numerical-control-apparatus internal processing unit address and a parameter, for at least one of a G code machining program command and an auxiliary function, main axis function, tool function, and second auxiliary function (MSTB) machining program command;

a variable/offset conversion means for setting and storing in the table provided in the memory a second numerical-control-apparatus internal processing unit address and a numerical-control-apparatus referencing address, for at least one of a variable machining program command and an offset machining program command; and a conversion data executing means for using data generated, and pre-stored in the memory, by the machining-program/internal-processing conversion means and the variable/offset conversion means, to directly execute the internal processing units in sequence, without performing processing for allocating commands in the machining program to internal processing units of the numerical control system, when the machining program is executed to control a control object.

19. A numerical control system according to claim 18, further comprising a conversion data judging means for judging, during a run of the machining program, whether converted data is present, and for requesting the conversion data executing means to execute the converted data if the converted data is present.

20. A numerical control system according to claim 18, further comprising a conversion-target-program judging means for detecting an instruction indicating conversion enable/disable written in the machining program, and for requesting the machining-program/internal-processing conversion means and the variable/offset conversion means to convert only machining programs that include a conversion-enable instruction.

21. A numerical control system according to claim 18, further comprising:

a conversion program selecting means for displaying on a display a machining program list and selecting a program to be converted from the machining program list; and a conversion-target-program judging means for referring to the program selected by the conversion program selecting means, and for requesting the machining-program/internal-processing conversion means and the variable/offset conversion means to convert only machining programs that include a conversion-enable instruction.

22. A numerical control system according to claim 18, further comprising a conversion result listing means for displaying on a display conversion results as a list.

23. A numerical control system according to claim 18, further comprising a conversion error display means for displaying on a display detailed information on conversion errors.

24. A numerical control system according to claim 18, further comprising a power-on machining-program-conversion activating means for activating the machining-program/internal-processing conversion means and the variable/offset conversion means at system power-on.

25. A numerical control system according to claim 18, further comprising a machining-program-conversion activating means for activating the machining-program/internal-processing conversion means and the variable/offset conversion means by input of a programmable logic controller (PLC) signal.

26. A numerical control system according to claim 18, further comprising an I/O signal notifying means for detecting a system-operator-working signal, and notifying the internal processing unit of a condition in accordance with a content of the signal.

27. A numerical control system comprising:

a conversion means for pre-generating data for allocating commands in a machining program to an internal processing unit of a numerical control apparatus, and for storing the data in memory;

a conversion data executing means for using the data generated by the conversion means and pre-stored in the memory to directly execute the internal processing unit in sequence, without performing processing for allocating the commands in the machining program to the internal processing unit of the numerical control apparatus, when the machining program is executed to control a control object; and a conversion-target-program judging means for detecting an instruction indicating conversion enable/disable written in the machining program, and for requesting the conversion means to convert only machining programs that include a conversion-enable instruction.

28. A numerical control system comprising:

a conversion means for pre-generating data for allocating commands in a machining program to an internal processing unit of a numerical control apparatus, and for storing the data in memory;

a conversion data executing means for using the data generated by the conversion means and pre-stored in the memory to directly execute the internal processing unit in sequence, without performing processing for allocating the commands in the machining program to the internal processing unit of the numerical control apparatus, when the machining program is executed to control a control object;

an I/O signal notifying means for detecting a system-operator-working signal, and notifying the internal processing unit of a condition in accordance with a content of the signal; and a conversion-target-program judging means for detecting an instruction indicating conversion enable/disable written in the machining program, and for requesting the conversion means to convert only machining programs that include a conversion-enable instruction.

* * * * *